United States Patent [19]

Murdock et al.

[11] Patent Number: 5,418,864
[45] Date of Patent: May 23, 1995

[54] METHOD FOR IDENTIFYING AND RESOLVING ERRONEOUS CHARACTERS OUTPUT BY AN OPTICAL CHARACTER RECOGNITION SYSTEM

[75] Inventors: Michael C. Murdock; Marc A. Newman, both of Mesa, Ariz.

[73] Assignee: Motorola, Inc., Schaumburg, Ill.

[21] Appl. No.: 272,451

[22] Filed: Jul. 11, 1994

Related U.S. Application Data

[63] Continuation of Ser. No. 939,242, Sep. 2, 1992, abandoned.

[51] Int. Cl.⁶ .......................... G06K 9/03; G06K 9/72; G06K 9/62
[52] U.S. Cl. ....................... 382/309; 382/224; 382/226; 382/229
[58] Field of Search ................ 382/57, 62, 36, 37, 382/38, 39, 40, 14, 30

[56] References Cited

U.S. PATENT DOCUMENTS

| | | | |
|---|---|---|---|
| Re. 31,692 | 10/1984 | Tyburski et al. | 382/62 |
| 4,032,887 | 6/1977 | Roberts | 382/57 |
| 4,058,795 | 11/1977 | Balm | 382/40 |
| 4,876,735 | 10/1989 | Martin et al. | 382/57 |
| 4,958,379 | 9/1990 | Yamaguchi et al. | 382/39 |
| 5,054,093 | 10/1991 | Cooper et al. | 382/36 |
| 5,181,256 | 1/1993 | Kamiya | 382/30 |

*Primary Examiner*—Leo H. Boudreau
*Assistant Examiner*—Phuoc Tran
*Attorney, Agent, or Firm*—Harold C. McGurk, IV; S. Kevin Pickens

[57] ABSTRACT

A post-processing method for an optical character recognition (OCR) method for combining different OCR engines to identify and resolve characters and attributes of the characters that are erroneously recognized by multiple optical character recognition engines. The characters can originate from many different types of character environments. OCR engine outputs are synchronized in order to detect matches and mismatches between said OCR engine outputs by using synchronization heuristics. The mismatches are resolved using resolution heuristics and neural networks. The resolution heuristics and neural networks are based on observing many different conventional OCR engines in different character environments to find what specific OCR engine correctly identifies a certain character having particular attributes. The results are encoded into the resolution heuristics and neural networks to create an optimal OCR post-processing solution.

13 Claims, 6 Drawing Sheets

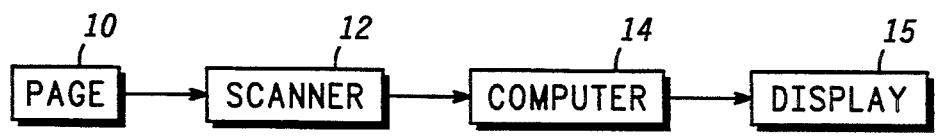
FIG. 1
FIG. 2
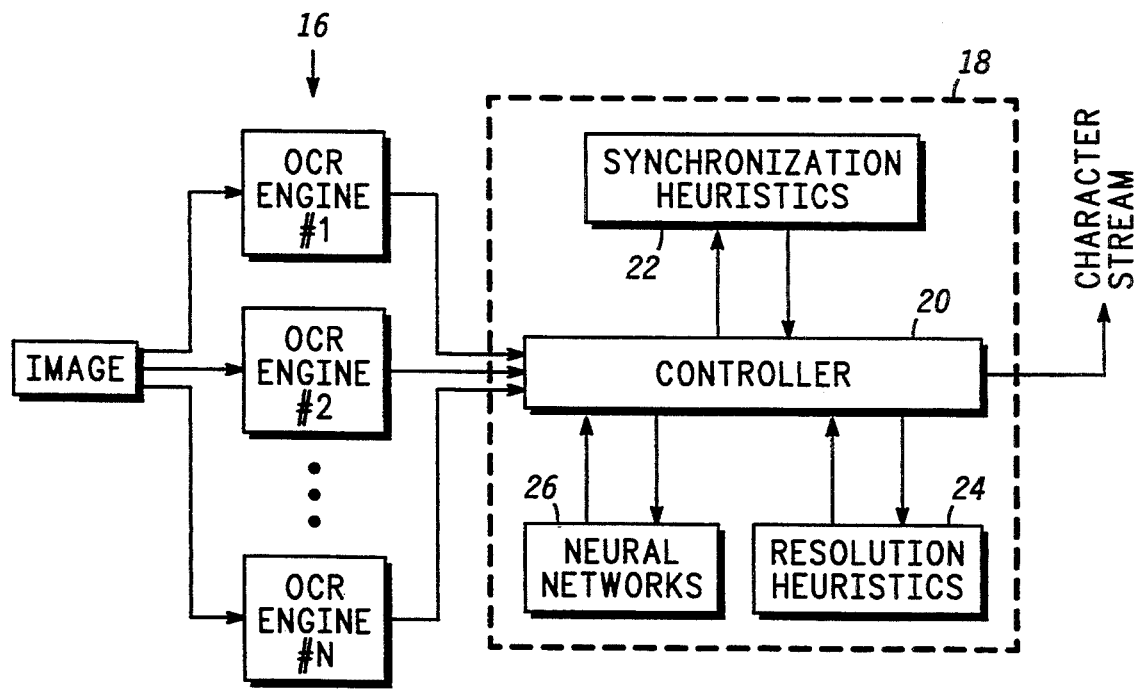

METHOD FOR IDENTIFYING AND RESOLVING ERRONEOUS CHARACTERS OUTPUT BY AN OPTICAL CHARACTER RECOGNITION SYSTEM

This application is a continuation of prior application Ser. No. 07/939,242 filed Sep. 2, 1992, abandoned.

TECHNICAL FIELD

This invention relates generally to an optical character recognition system and, in particular, to a post-processing method for combining different optical character recognition engines to identify and resolve characters and attributes of the character which are erroneously recognized and output by the optical character recognition engines.

BACKGROUND OF THE INVENTION

Optical character recognition (OCR) technology is a well known method for converting paper documents into digitized form. Basically, a document is scanned by a commercially available scanner to produce a raster-image. The raster-image is passed to commercially available software, an optical character recognition (OCR) engine, where a corresponding character recognition algorithm processes the scanned raster-image to recognize characters which include numerical digits and some special characters such as "&", "$" and "#", for example.

One of the main problems of conventional OCR technology is that the accuracy of recognizing characters is limited. Some OCR engines can accurately recognize characters from some character environments but perform poorly in other types of character environments. For example, a first OCR engine may be able to recognize Helvetica style characters with a ninety percent accuracy rate. However, the first OCR engine may only be able to recognize Palatino style characters with a fifty percent accuracy rate. A second OCR engine may provide accurate results for Helvetica characters but not for Courier style characters. A third OCR engine may perform better for 10 point Courier characters than for 18 point Courier characters. Therefore, if one page of a document contains Courier and Helvetica style characters in 10 and 18 points, using only one of the OCR engines will produce less than adequate results because none of the OCR engines can optimally recognize characters in all different types of character environments.

There is a significant need in optical character recognition to provide a method which combines the best optical character recognition features of each of the OCR software engines to identify and resolve erroneous characters from the many different types of character environments.

SUMMARY OF THE INVENTION

In the present invention, there is provided an optical character recognition method for identifying and resolving character recognition mistakes made by optical character recognition engines. This invention is the result of observing many different conventional optical character recognition engines in different character environments and determining what particular OCR engine makes what type of mistakes for each of the different character environments. Once the determinations were made, a post-processing method was constructed to merge multiple OCR engines that yields a higher accuracy level than would be possible if only a single OCR engine was used.

Thus, it is an advantage of the present invention to observe many different conventional OCR engines in different character environments to find what particular OCR engine will more accurately recognize each character most of the time and to combine the results of the observations from the different OCR engines into a post-processing method which will identify and resolve OCR character mistakes.

It is another advantage of the invention to identify and resolve erroneous characters from many different types of character environments.

It is also an advantage of the invention to use heuristics to synchronize characters output by the OCR engines.

Further, it is an advantage of the invention to use heuristics to resolve character recognition mistakes by selecting an OCR engine which is most likely to be correct in recognizing a character.

Yet another advantage of the invention to use a neural network to help in predicting which OCR engine is most likely to be correct when heuristics alone are incapable of resolving a character recognition error.

According to one aspect of the invention, an optical character recognition method is provided for identifying and resolving erroneous characters output by an optical character recognition system. The method is executed on a computer as part of a computer implemented process. Moreover, the computer is connectable to receive optical character recognition (OCR) engine outputs. The method comprises the steps of: a) identifying mismatches between characters and attributes of said characters in OCR engine outputs by using synchronization heuristics; and b) resolving each of said mismatches identified in step (a) by using resolution heuristics and neural networks.

BRIEF DESCRIPTION OF THE DRAWINGS

The invention is described with particularity in the appended claims. However, other features of the invention will become more apparent and the invention will be best understood by referring to the following detailed description in conjunction with the accompanying drawings in which:

FIG. 1 shows a block diagram of the hardware configuration where a scanner is connected to a computer in accordance with a preferred embodiment of the invention.

FIG. 2 illustrates a block diagram of the software modules of the synchronizer method in accordance with a preferred embodiment of the invention.

DESCRIPTION OF THE PREFERRED EMBODIMENTS

Figure 3:
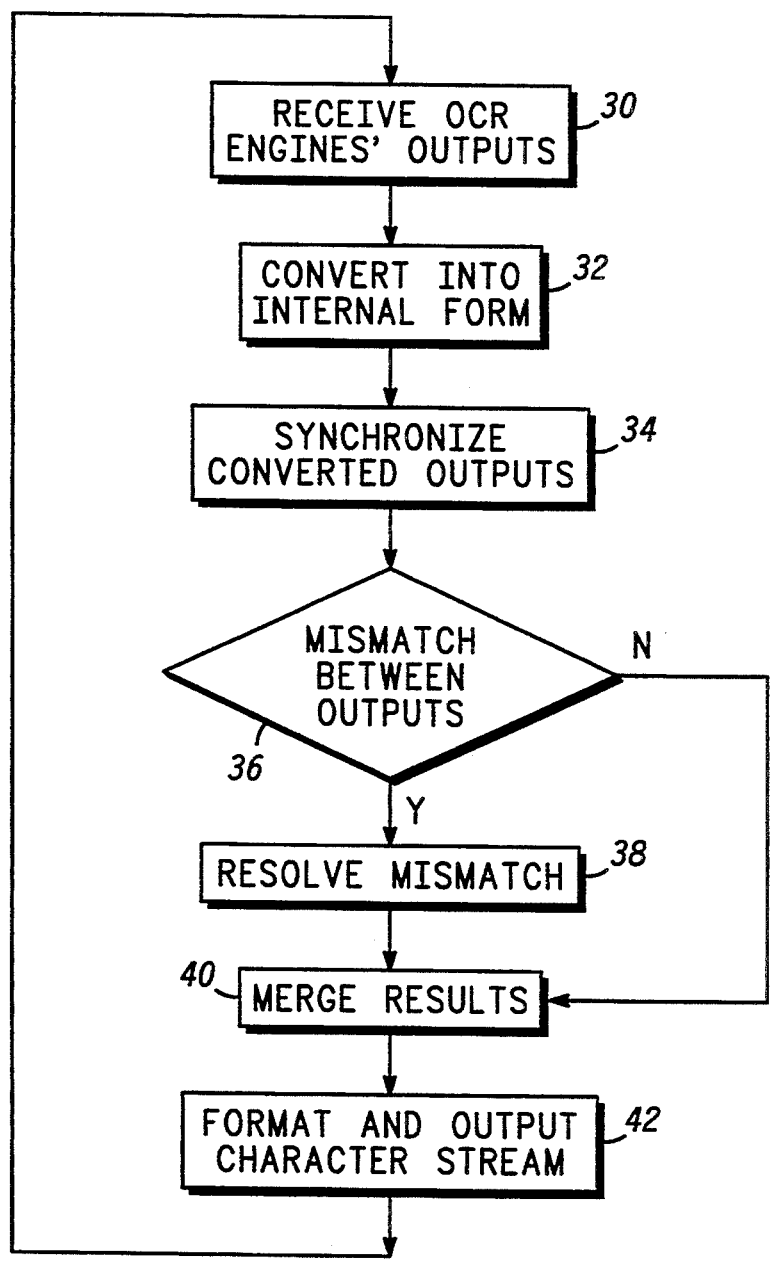
FIG. 3 shows a flowchart diagram for the optical character recognition process for synchronizing outputs of OCR engines and resolving mismatches in accordance with a preferred embodiment of the invention.

The system hardware configuration is shown in FIG. 1. A commercially available scanner 12, such as manufactured by Fujitsu or Xerox, is connected to a Sparcstation TM computer 14. Computer 14 is made by SUN. The operating system running the SUN computer 14 is UNIX TM. The computer 14 is coupled to a display, such as a CRT display 15, for example. The CRT 15 displays the image scanned by the scanner and the results of the post-processing performed by this invention. This invention will work with and is readily portable to most commercially available scanner, computer, and CRT system configurations.

The document conversion process for converting a page of a document into a digitized character stream commences by feeding a page 10 of a document into a scanner 12. This invention will read any type of document including any type of book, technical manual, magazine, newspaper, etc., but is inherently dependent on the limitations of the scanner itself. Moreover, the documents can have any of the many different types of character environments including different typefaces, pitches, point sizes, spacing, etc. After the scanner 12 scans the page, the scanner 12 generates a raster-image of the page as a TIFF file and transmits it to the computer 14. TIFF represents "Tagged Image File Format" and is well known in the art. This invention is not dependent on receiving only TIFF formatted files but can also receive outputs having a different type of output format.

Once the computer 14 receives the TIFF file, the characters are processed on a line-by-line basis by OCR engines 16 as shown in FIG. 2. The main purpose of the OCR engines 16 is to recognize characters from the raster-image or TIFF file. Some of the commercially available OCR engines 16 are made by Calera and Xerox, for example. The OCR engine is usually software and is most often marketed with the accompanying scanner as part of a package. This invention, however, is able to use any of the OCR engines 16 and is not dependent on any specific type of OCR engine or scanner.

Each of the OCR engines 16 execute their respective character recognition algorithm which examines each character in a zone and determines what is the best possible approximation of what the character should be. Each of the OCR engines 16 outputs their result as a standard character stream such as an ASCII character stream with embedded markup. The ASCII stream ordinarily has the embedded markup or attribute information about words and characters first, followed by what the actual characters are themselves. The ASCII output format is usually described in the manual accompanying the commercially available OCR scanner and software engine package. This invention will work with any of the outputs from any of the commercially available OCR engines including the Page Description Architecture format of Calera or the XDOC format of Xerox.

Character recognition algorithms executed by OCR engines 16 primarily have two processes. The first process is a character segmentation process which identifies a bounding box of a character that is to be processed. The second process is a discrimination process for determining into what class the character should be classified.

TABLE 1

| Factor Type | Factor | Typical Factor Values |
|---|---|---|
| Character | Typeface | Times, Helvetica, Courier |
| | Line size | Thin, Normal, Bold |
| | Ligature attributes | On/Off |
| | Serif attributes | On/Off |
| | Pitch | Roman, Oblique, Italic |
| | Point Size | Size of character |
| | Spacing | Fixed, Proportional |
| | Kerning | On/Off |
| | Modifiers | Diacritical marks, Underline |
| Image | Skew | Degree of rotation |
| | Noise | Broadband, Impulsive, Artifacts |
| | Resolution | Underresolved |
| | Contrast | Too light, Too dark |

Table 1 lists some of the different types of character environments that affect the accuracy of character segmentation and discrimination algorithms. Some of these environments include line size, point size, pitch and spacing. Segmentation and discrimination algorithms must consider these factors because each page of a document may potentially include all of the listed character environments. Some of the early character recognition systems typically relied on fixed font recognition and thus were bound to a particular point size, such as Pica or Elite, for example, or a particular font style or typeface, such as Courier or Helvetica, for example. These constraints held the typeface factor to a constant in order to improve the detection rate. Modern omnifont character recognition systems do not have this constraint, but also do not have schemes for adequately dealing with all possible pattern variations. For example, some systems have significantly reduced recognition accuracy on ornate, thin-stroke typeface styles in which the character segments do not connect.

OCR software engines, in general, make two types of character recognition errors. The first type of character recognition errors are character substitution errors. These types of errors occur when a character is recognized when no character exists, a character is recognized as multiple characters, or multiple characters are recognized for a different set of characters. A character substitution error describes the form of the error but it does not specify the kinds of errors that are committed in a particular error type. An example of a one-to-two character substitution error is when the word "old" is incorrectly processed by an OCR engine as "olcl". The OCR engine incorrectly substituted two characters ("cl") for the letter "d". An example of a different error, but with the same error type is when the word "man" is incorrectly processed by an OCR engine as "nian". The OCR engine incorrectly substituted two characters ("ni") for the letter "m".

TABLE 2

| Substitution Error Type | OCR | OCR Output Stream |
|---|---|---|
| A0B1 | A | abdef |
| | B | abcde |
| A0B2 | A | abefg |
| | B | abcde |
| A0B3 | A | aefgh |
| | B | abcde |
| A1B0 | A | abcde |
| | B | abdef |

TABLE 2-continued

| Substitution Error Type | OCR | OCR Output Stream |
|---|---|---|
| A1B1 | A | ab<u>c</u>de |
|  | B | ab<u>x</u>de |
| A1B2 | A | ab<u>c</u>de |
|  | B | ab<u>xy</u>d |
| A1B3 | A | ab<u>c</u>de |
|  | B | ab<u>xyz</u> |
| A2B0 | A | ab<u>c</u>de |
|  | B | abefg |
| A2B1 | A | ab<u>cd</u>e |
|  | B | a<u>x</u>def |
| A3B0 | A | ab<u>cd</u>e |
|  | B | aefgh |
| A3B1 | A | ab<u>cd</u>e |
|  | B | a<u>x</u>efg |

Table 2 contains eleven character substitution errors when the system has only two software OCR engines A and B. Error type AxBy is an error in which OCR A engine recognized x number of characters and OCR B engine recognized y number of characters. For example, A0B1 listed in Table 2 represents a case when OCR A recognized no characters but OCR B recognized one character. Hence, this is a zero-to-one (0:1) character substitution error. Similarly, a two-to-one character substitution error (A2B1) exists when OCR A recognized two characters but only one character was recognized by OCR B. In Table 2, the output stream from each OCR engine is shown as the characters a, b, c, d, etc. Underlined characters shown in Table 2 represent characters in the OCR output stream which are in recognized differently by OCR engines A and B.

The second type of character recognition errors are character attribute errors which occur when an OCR engine incorrectly recognizes or fails to recognize one or more attributes of a character including italics, boldface, underline, point size, etc.

TABLE 3

| Attribute Error | Correct Character | OCR Character |
|---|---|---|
| Italics False | x | *x* |
| Italics Failed Recognition | *x* | x |
| Boldface False | x | x |
| Boldface Failed Recognition | x | x |
| Underline False | x | <u>x</u> |
| Underline Failed Recognition | <u>x</u> | x |
| Character Pointsize | x | X |

Table 3 lists seven of the many different types of character attribute errors. As shown in Table 3, an OCR engine may commit a character attribute error when the OCR engine recognized an "x" although the "x" is not boldfaced. This type of character attribute error is referred to as a false positive condition because the OCR engine is recognizing an attribute even though it is not present. Moreover, an OCR engine may produce a character recognition error when it fails to recognize the attribute even though it is present. For example, an "x" is only recognized as "x". This type of error is referred to as a failed recognition error.

As shown in FIG. 2, after the OCR engines 16 process and recognize characters, a character stream which comprises both correctly and incorrectly recognized characters is sent to the optical character recognition post-processing method 18. The post-processor 18, illustrated in FIG. 2 as a block diagram of interconnected software modules, is a method for identifying and resolving characters which are recognized incorrectly by the OCR engines 16. The software modules comprise a controller 20, synchronization heuristics 22, error resolution heuristics 24 and a set of modified multilayer perceptron neural networks 26.

As shown in FIG. 2, each of the ASCII character OCR engine outputs are sent to a post-processor 18 and received by controller 20. The overall method operation performed by the post-processor 18 is shown in FIG. 3. Briefly, the controller 20 receives the OCR engine outputs in step 30 and converts in step 32 each of the OCR engine outputs into two separate lists, a character list and a character-attribute list. The controller 20 then synchronizes in step 34 the character lists to each other using synchronization heuristics to form a combined character-attribute list. If any mismatch of characters or their corresponding attributes occurs in the combined character-attribute list as tested in step 36, the OCR post-processor 18 resolves in step 38 the mismatches using heuristics and neural networks. Once the mismatch is resolved, the controller 20 merges in step 40 the results of the matches and mismatches together into a single character stream and outputs in step 42 the merged result into a standard character output stream. Each of these steps shown in FIG. 3 are explained in more detail below.

A character list only includes the characters themselves. Characters include upper and lower case characters, the numerical digits (0-9) and special symbols such as "$", "%" and "!", for example. A character-attribute list includes the characters of the words and each of the character's specific attributes, such as whether any character is italicized, boldfaced or underlined, for example. There is no attribute for capitalization because there is a distinct ASCII value for the capitalized letter from the lower case letter. The character-attribute list also contains uncertainty information about how certain the OCR engine was in recognizing a character.

After the controller 20 receives in step 30 the OCR engines outputs, it converts in step 32 each of the outputs into two lists, a character list and a character-attribute list. One of ordinary skill in the art is able to read the ASCII character stream based on the format described in an OCR engine manual and translate the OCR output into a character list and a character-attribute list.

If there were only two OCR engines, A and B, for example, the controller 20 would create a separate character list for OCR A and OCR B. The following is an example of the character lists that might be created from OCR A and OCR B from the phrase "This old man", where ∅ represents a blank space:

OCR A=[This∅old∅rrian]

OCR B=[This∅olcl∅man]

CHARACTER LISTS

As can be observed, neither OCR A nor OCR B is completely correct for each word in the phrase. Each of the character recognition algorithms executed by OCR A and B made a separate mistake in recognizing certain characters. OCR A incorrectly interpreted the letter "m" as "r r i" while OCR B incorrectly recognized the letter "d" as "c l".

An example of character-attribute lists for the phrase "This old man" is given below, where ∅ is equivalent to a blank space:

| OCR A CHARACTER-ATTRIBUTE LIST | | | | | | | | | | | | | |
|---|---|---|---|---|---|---|---|---|---|---|---|---|---|
| T | h | i | s | ∅ | o | l | d | ∅ | r | r | i | a | n |
| <1> | <1> | <1> | <1> | <1> | <1> | <1> | <1> | <1> | <1> | <1> | <1> | <1> | <1> |
| <2> | <2> | <2> | <2> | <2> | <2> | <2> | <2> | <2> | <2> | <2> | <2> | <2> | <2> |

| OCR B CHARACTER-ATTRIBUTE LIST | | | | | | | | | | | | |
|---|---|---|---|---|---|---|---|---|---|---|---|---|
| T | h | i | s | ∅ | o | l | c | l | ∅ | m | a | n |
| <1> | <1> | <1> | <1> | <1> | <1> | <1> | <1> | <1> off | <1> off | <1> on | <1> on | <1> on |
| <2> | <2> | <2> | <2> | <2> | <2> | <2> | <2> | <2> | <2> | <2> | <2> | <2> |

In the character-attribute lists, <1> and <2> represent whether one of the attributes is on or off. For the example shown above, if attribute <1> represented whether a character is underlined, all of the <1> for the phrase would be off. Similarly, if attribute <2> represented whether a character was boldfaced, the <2> for each character in the words "This" and "man" would be off while <2> for each character of "old" would be on. The lists shown above are provided as an illustration of the character-attribute lists, but there are more than two attributes for each character.

If a character substitution error occurred, as shown above in the Character Lists, an attribute would be assigned to each erroneous character as shown in the OCR A and B character-attribute lists. As shown above, each of the characters "cl" which was substituted for the letter "d" would have a corresponding attribute in the character-attribute list. The attribute information, even for erroneous characters, is important for resolving mismatches and determining the correct character and their corresponding attributes as discussed in more detail below.

Once the OCR outputs are converted in step 32 into the character and character-attribute lists, the converted output character lists are synchronized in step 34 to find any character recognition errors made by the OCR engines. Synchronizing the outputs means that each character from the output of one OCR engine is trying to be matched to a similar character of the output stream from another OCR engine. Character recognition errors are therefore determined by identifying discrepancies between OCR engine outputs, such as matching or mismatching characters, sizes, attributes, and the number of characters involved and acknowledging character uncertainty reports directly from the corresponding OCR engine. Character uncertainty reports are part of the embedded markup in the ASCII character stream received from the OCR engines output. The number of characters involved in an error is a primary concern because an OCR engine can completely miss a character, create phantom characters, or mistake one number of characters for another number of characters.

In step 34, the controller 20 uses synchronization heuristics 22 to synchronize the outputs of the OCR engines and to isolate errors in the OCR engine outputs from non-errors. The synchronization heuristics 22 are rules for pattern matching two or more OCR engine outputs. The pseudo-code for how the synchronization in step 34 or character matching is performed is given below:

| SYNCHRONIZATION PROCESS |
|---|
| For each line of a page of a document |
|   Until OCR A character list or OCR B character list are empty |
|     If character from OCR A character list is equal to character from OCR B character list then |
|       Merge corresponding character and attribute information from both the OCR A and OCR B character-attribute list |
|     Else |
|       Identify the type of synchronization mismatch by using synchronization heuristics |

As can be seen from the pseudo-code, synchronizing in step 34 is executed on a line-by-line basis. If either the OCR A character list or the character-attribute list is empty, controller 20 recognizes that it is at an end of a line. Thus, the controller 20 will return to the main loop and synchronization will continue on any of the remaining lines.

Initially, the controller 20 uses the character lists for synchronizing or matching characters from different OCR outputs. If the current character from both of the OCR A and OCR B output match, then the characters are synchronized. One of the key heuristics for synchronizing the outputs is that the longest consecutive list of characters in each of the OCR outputs that agree represents synchronized text. For the "This old man" example above, controller 20 will match the outputs of OCR A and B according to the longest consecutive list of matching characters. Thus, the characters in "This∅ol" are synchronized first.

If the characters do not match, the controller 20 must determine what type of character substitution error occurred. Locating character recognition errors is complicated by four factors. First, the uncertainty in the number of consecutive characters in error may make locating the erroneous characters much harder. For example, if "old" was recognized as "dcl" or as "olcl" by an OCR engine, the controller 20 must be able determine that "dcl" has two consecutive character substitution errors while "olcl" has only one character substitution error.

The second factor which complicates finding character recognition errors is that a number of consecutive correct characters may be represented by incorrect OCR characters. For example, the letters "rn" may be recognized by an OCR engine as "m" or "rri". Third, there is a possibility that the competing OCR engines may have made different errors with respect to the number of characters. For example, the letter "m"

could be recognized by one OCR engine as "rri" while a second OCR engine recognizes "m" to be "rn".

The fourth factor which complicates synchronizing the OCR outputs is that the error in question may be closely surrounded by other errors in the text. For example, the word "man" could be recognized as "rrion" or as "rnari". It is important to note that none of the characters match except for the first erroneous character "r".

In step 34 of FIG. 3, pattern matching performed by controller 20 to synchronize different OCR engine outputs is accomplished by using the synchronization heuristics 22 as shown in FIG. 2. The synchronization heuristics 22 are programmed in Prolog although any other computer language can be used as well. When character mismatches are found, the controller 20 uses only character ID information which includes upper and lower case information to compare characters on both sides of the questionable character or characters in each OCR output. Therefore, the controller 20 utilizes synchronization heuristics 22 to process characters of each line left to right, looking ahead as many characters as necessary to maintain synchronization. Moreover, the controller 20 uses the synchronization heuristics 22 to resolve errors as they are found so that the surrounding characters are always resolved to the left and at least partially matched with characters that agree to the right.

The synchronization heuristics 22 pattern match OCR engine outputs by varying a number of look-ahead characters and a character substitution ratio. The synchronization heuristics 22 used by the controller 20 are applied in an order which is statistically proven to resolve character mismatches that occurs more often than other character mismatches.

The number of look-ahead characters means the number of characters in a character list which are examined by the controller 20 past a number of questionable characters as set by the character substitution ratio. Four look-ahead characters are initially preferred in the synchronization rules 22. However, the number of look-ahead characters can be set according to what produces the most efficient synchronization. For example, a synchronization heuristic 22 may examine four characters past a single questionable character in each of the character lists to determine whether the four look-ahead characters match. If the controller 20 determines by using the first heuristic that the four look-ahead characters agree in each of the character lists after the single character, then the controller 20 has found a character mismatch. The character mismatch in this example is a single character in each of the character lists which does not agree.

The character substitution ratio helps the controller 20 determine what type of character substitution error occurred within the character lists of the OCR outputs. The character substitution ratio dictates how many characters to ignore in each of the character lists so that the number of look-ahead characters can be compared. In the preferred embodiment, the controller 20 will try the following character substitution ratio combinations but not necessarily in this order: 1:1, 0:1, 1:0, 2:1, 1:2, 3:2, 2:3, 1:3, 4:3, 3:4, 4:2, 2:4, 4:1, 1:4. This invention is not limited to these specific character substitution ratios but could also include using more characters in the ratios, such as a 7:5 or 3:5 character substitution ratio, for example.

The synchronization heuristics 22 change the character substitution ratio and the number of look-ahead characters in a predetermined order to help the controller 20 determine which characters mismatch. This mismatch identifies a mistake made by an OCR engine. One of the keys to the synchronization heuristics 22 is that they help the controller 20 maximize the number of matches surrounding mismatches rather than minimizing the number of characters identified in error. This technique helps to resolve synchronization of non-matching characters faster than only trying to pair non-matching characters.

The following is an example to demonstrate how the controller 20 synchronizes OCR engine outputs A and B based on a heuristic which sets the character substitution ratio and a number of look-ahead characters. In this example, if a heuristic set the character substitution ratio as a 1:2 ratio and the number of look-ahead character to four, the controller 20 will ignore one character from the OCR A output character list while ignoring two characters from the OCR B output character list. The controller 20 will then try to match characters 2-5 from the character list of OCR A to characters 3-6 from character list of OCR B. If the number of look-ahead characters agree for a specific character substitution combination, then the controller 20 will know which characters are not matching and the ratio of mismatched characters. Therefore, if characters 2-5 of OCR A character list match characters 3-6 of OCR B character list, then the controller knows that a 1:2 character substitution error has occurred and that character 1 of OCR A character list and characters 1 and 2 of OCR B character list are involved in the mismatch.

For the "This old man" example given above and the accompanying character lists from OCR A and B, the controller 20 will not be able to match four, three or two look-ahead characters. The reason is that the letters "rri" from OCR A will never match the "m" from OCR B. The controller 20 will only be able to match the spaces ($\emptyset/\emptyset$) using one look-ahead character and a 1:2 character substitution ratio as set by one of the synchronization heuristics 22. Therefore, the controller 20 is able to determine that a 1:2 character substitution error occurred.

After the matched spaces are stored in the result list, controller 20 needs to determine what character substitution error occurred for the remaining characters: "rrian" and "man". Using the synchronization rules 22, the controller will eventually match two look-ahead characters ("an") when the character substitution ratio is 3:1. Hence the controller 20 will know that a 3:1 character substitution error occurred.

Once all the synchronization errors have been resolved, the synchronization of the OCR outputs is complete. The result of the synchronization in step 34 is a combined character-attribute list which details how the OCR characters are matched. For example, the following list is the result of synchronizing the OCR character lists given above: (T/T), (h/h), (i/i), (s/s), ($\emptyset/\emptyset$), (o/o), (l,l), (d/cl), ($\emptyset/\emptyset$), (rri/m), (a/a), (n/n). This list includes attribute information as well as how certain each of the OCR engines are in recognizing the character or characters.

According to FIG. 3, once the OCR engine outputs have been synchronized in step 34, if there are no mismatches or all the characters in each line of the OCR outputs agree as well as their corresponding attribute information, the controller 20 in step 36 will not need to resolve any conflicts between OCR engine outputs. Therefore, the character-attribute list resulting from synchronization in step 34 contains correct characters and their attributes. Otherwise, if there are any mismatches as determined in step 36 between the OCR outputs, as shown in the example for OCR A and B above, the optical character recognition method must resolve in step 38 the mismatches to determine what is the correct character from what was processed by each of the OCR engines. The method used by the optical character recognition system to resolve the mismatches is shown as a flowchart in FIG. 4.

Figure 4:
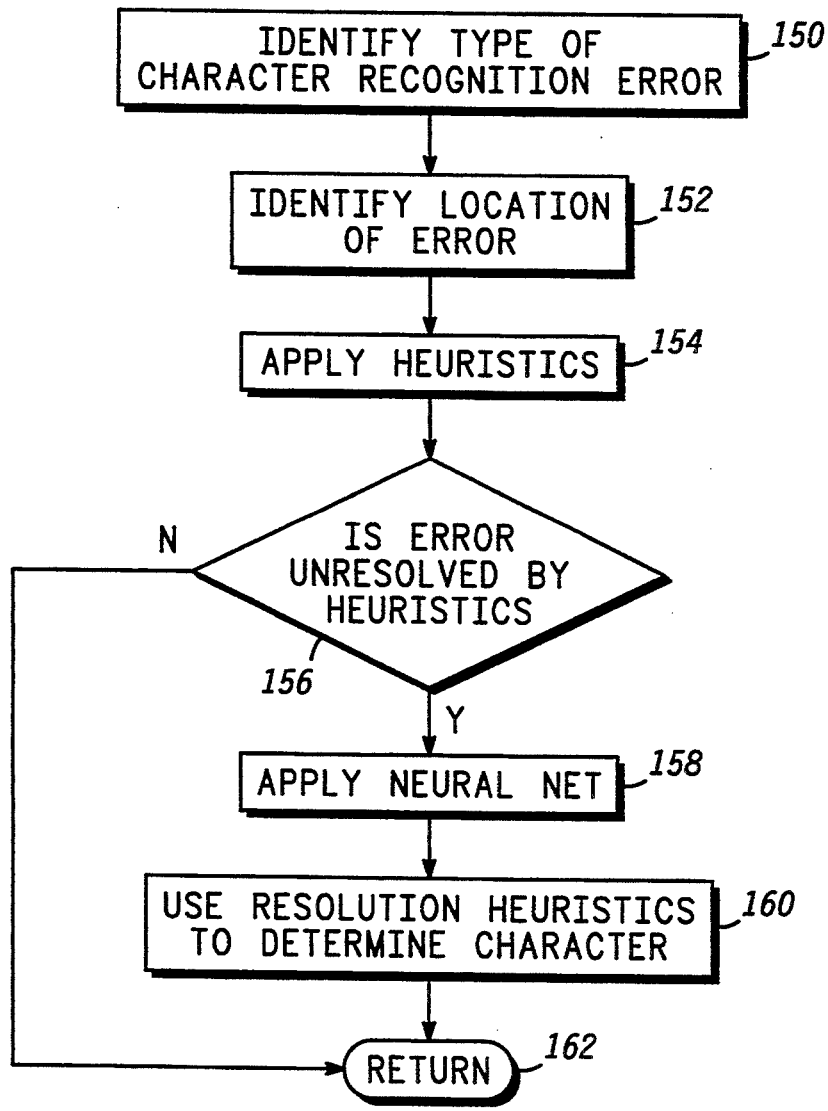
FIG. 4 shows a more detailed flowchart diagram for resolving a mismatch between synchronized yet conflicting OCR engine outputs in accordance with a preferred embodiment of the invention.

The following is a brief discussion of the steps shown in FIG. 4. First, the controller 20 identifies in step 150 the type of character recognition error, a character substitution error or a character-attribute conflict, and identifies in step 152 the location of the error within the combined character-attribute list. Based on this information, the controller 20 applies in step 154 resolution heuristics 24 to try initially to solve the character recognition error. If the error is unresolved by one or more resolution heuristics 24 in step 156, a neural network corresponding to the error substitution type is selected and applied in step 158 in helping to resolve the character or attribute disagreement. Once the neural network outputs what it thinks the appropriate character is (i.e. what OCR engine is most likely to be correct), the controller 20 uses one or more of the resolution heuristics 24 in step 160 to determine what the character will be based on the neural network output. A more detailed description of each of the steps is given below.

Once the outputs have been synchronized in step 34, the controller 20 has identified in step 150 the type of character recognition error that occurred. The controller 20 categorizes the error type based on the character ratio mismatch, attribute information, and certainty of the error. A character substitution ratio mismatch represents the number of characters involved in the mismatch as resolved by the controller 20. The character mismatch is easily determined from the pairing of characters in the character-attribute created. Order is important in a character ratio mismatch because a 1:2 error is different than a 2:1 error. This is because different OCR engines have unique character recognition algorithms and characteristics which can be accounted for in a heuristic or a neural network. For example, OCR engine A may often output "cl" for the letter "d". The optical character recognition method therefore will be able to correct this incorrect character substitution and replace "cl" with the correct character "d" by using a heuristic or neural network.

The error attribute information is characterized by the character ID and attribute information including underline, italics, bold, size, etc. The error certainty is taken directly from each OCR output, part of the embedded markup in the standard ASCII character stream, which includes the overall degree of confidence of the OCR reports. The confidence level is based on the scanned page characteristics, such as contrast, clarity, font, etc., and level-of-effort used by each OCR engine to make each recognition. The confidence factor is also based on the individual character extent and shape and whether the characters are recognized as part of a correctly spelled word.

Once the error type has been identified in step 152, the controller 20 in step 154 uses one or more resolution heuristics 24 to determine what is the appropriate method of resolution. Heuristics are domain specific rules-of-thumb that relate to behavior patterns exhibited by an OCR engine. Some errors are easily resolved by heuristics, but more difficult and complex errors are resolved using a neural network. If a heuristic approach was only used, this would be inefficient in execution and very costly to develop. However, each error type resolved by heuristics reduces the need for using a neural network to resolve an error, reduces the training costs of the neural networks and increases the accuracy of the remaining errors to be solved by the neural net. Therefore, a balance between the two methods of resolution, heuristics and neural networks, is important for reducing development costs and improving execution efficiency and accuracy. The balance between the two methods of resolution is determined by using statistics. The resolution heuristics 24 are programmed in Prolog but other programming languages can be used.

Heuristics and neural networks rely upon the best character recognition features from each of the OCR engines. In other words, the analysis performed by heuristics and neural networks is based on observing what OCR engine is most reliable in recognizing a certain character having certain attribute information. The behavior pattern exhibited by an OCR engine is known through testing the OCR engine in many of the different character environments. Testing is executed by inputting to an OCR engine a known character environment and evaluating what result is produced. The result of whether the OCR engine performs well in one character environment versus another environment is initially determined by an operator, where the result is incorporated into a rule-of-thumb heuristic or into a neural network. Therefore, the OCR engines are combined into an optimal post-processor 18 through using either resolution heuristics 24 and neural networks 26 based on the evaluation of which OCR engine performs best in a certain character environment.

TABLE 4

| OCR A | OCR B | SYNCHRONIZER OUTPUT |
|-------|-------|---------------------|
| a     | a     | a                   |
| a     | a?    | a?                  |
| a     | b?    | neural network      |
| a     | b     | neural network      |
| a?    | a?    | a?                  |
| a?    | b?    | neural network      |
| a?    | b     | neural network      |
| b?    | b?    | b?                  |
| b?    | c?    | neural network      |
| b?    | b     | b?                  |
| b?    | c     | neural network      |
| b     | b     | b                   |
| b     | c     | neural network      |

Table 4 lists some of the heuristics employed by the controller 20 in resolving character recognition errors. In Table 4, the letter "a" represents the correct character while letters "b" and "c" represent incorrect characters. The question marks ("?") indicate an uncertain character marker or that the controller 20 is not one-hundred percent certain that the the result of the post-processing for a specific character is actually correct. If the certainty is below a certain threshold, then the computer 14 will highlight the uncertain characters of the raster-image displayed on the display 15 shown in FIG. 1. An operator will be able to change any of highlighted characters if they are wrong by inputting the changes to the computer 14. This method most importantly reduces the number of times an operator will manually have to change an erroneous character.

In Table 4, for the case when both OCR A and OCR B recognize an "a" for the letter "a", the heuristic helps the controller understand that when both OCRs agree to the same letter, the output is the matching letter. Therefore, this heuristic is used not only for the case when OCR A and B recognize the correct letter "a", but even when both OCR A and B recognize an incorrect letter "b". However, this result depends on other information such as the certainty of the OCR engines recognizing the characters. Another heuristic from Table 4 is that when both letters are the same but one or both of the OCRs are uncertain of the letter, then output the letter with the uncertainty to the controller 20. This heuristic will resolve the case where OCR A is sure it sees an "a" but OCR B is not fully certain whether it sees an "a" ("a?"), or when both OCR A and B are not fully certain whether they see an "a" ("a?").

There are other heuristics than those provided in Table 4. For example, if a single character within a word had an attribute not shared by the rest of the word, then most likely the single character would adopt the attributes of the other characters of the word. For example, if a single character was not underlined, but the rest of the word was underlined, the heuristic might also underline the single character if the OCR engine was known to miss underlining of characters. Similarly, if a word was in italics, but a single character was not italicized, then the heuristic may italicize the single character to match the rest of the word. Another heuristic might change a lower case letter which follows a period (".") and two spaces to its counterpart upper case letter because most likely the letter is the beginning of a sentence and is usually an upper case letter.

Figure 5:
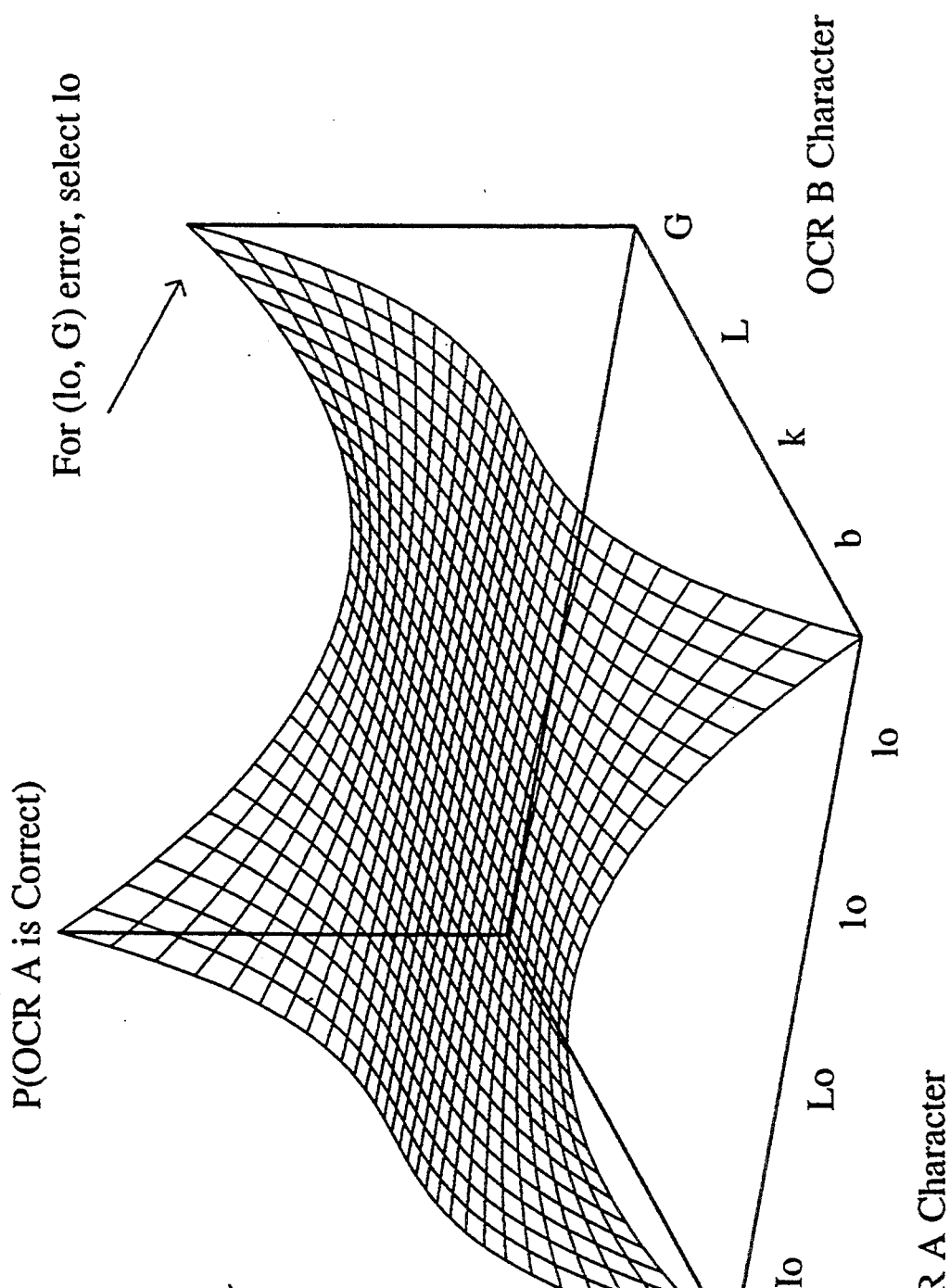
FIG. 5 illustrates an example of a statistical model learned by a neural network to resolve differences between two OCR engines.

The heuristics used are rules developed from observing and understanding the English language, linguistic principles, mechanical sentence structure and general rules of form of a document. The post-processing method will incorporate these rules into the heuristics for an OCR engine which is more reliable than another OCR engine for recognizing certain characters having particular attributes. However, if the error is unresolvable in step 156 by using any of the heuristics, the character substitution error or character-attribute error is resolved in step 158 by using a neural network as shown in FIG. 5. As shown in Table 5, a certain type of error, such as "a" and "b?", for example, may be automatically programmed into a heuristic to know that a neural network needs to be used because one or more heuristics are unable to resolve which OCR engine output is more reliable.

Neural networks are an information processing technology modeled after the topological and processing properties of the brain and the nervous system. A neural network comprises simple computational elements, called neurons, which are interconnected by synaptic weights. The three distinguishing features used to characterize current neural network models are (i) the neuron model; (ii) the topology of the network; and (iii) the mechanism for adaptation, called a learning rule. The neural network used in this invention is a modified Multilayer Perceptron (mMLP), trained with a learning rule called Backward Error Propagation (BEP). The mMLP is a neural network model described below and the BEP is a well known neural network training technique.

An important characteristic of the mMLP using the BEP is its ability to learn and adapt to a particular problem domain. In this invention, this characteristic is being exploited for the purpose of constructing a statistical model of orthogonal OCR errors as shown in FIG. 5, for example. FIG. 5 is a statistical model of the recognition accuracy of OCR engine A when used with another OCR engine B and when the thirteen factors that affect recognition accuracy are constrained to particular values.

The statistical model shown in FIG. 5 was constructed from the thirteen factors in Table 1. A fifteen din-tensional abstract configuration space, E, may be constructed in which each factor is a dimension in the space. The set of all character combinations output by OCR A and the set of all character combinations output by OCR B are the final two dimensions of E. A particular set of factors, such as OCR A output="d",OCR B output="cl", Typeface=Helvetica, Line size=bold, Point size=14, etc., is represented as a point in E, for example.

In some regions of E, an OCR will perform with high accuracy. However, in other regions the error rate is high. This observation may be quantified as a probability surface in E. This probability surface, $S_A$ and $S_B$, is a function of the thirteen factors that affect the recognition accuracy of OCR A and OCR B, respectively. In regions of E in which OCR A performs with high accuracy, $S_A = 1$. In regions in which high error rates occur, $S_A = 0$. This probability surface $S_A$, as shown in FIG. 5, is a statistical model of the recognition accuracy of OCR A. It encodes the probability of correctness for OCR A given a particular set of conditions. The surface as shown in FIG. 5 is rendered in a three dimensional plot, holding constant the other thirteen dimensions to unspecified but particular values.

Regions of E in which $S_A \neq S_B$ are called "error-orthogonal" regions. OCR engines are "orthogonal" when they are combined to yield large error-orthogonal regions. After performing a variety of experiments, it was determined that although some OCR error-orthogonality could be observed, it was not possible through observation alone to accurately identify more than a small faction of the error-orthogonal regions for two particular OCR engines. It was determined that to accurately identify the error-orthogonal regions, an automated method of learning the probability surfaces, $S_A$ and $S_B$, must be devised. The neural network is such a method.

The neural networks 26 in FIG. 2 comprises a system of multiple neural network modules. A separate neural network is used for each type of character substitution error listed in Table 1. Each of the neural network modules is of the form shown in FIG. 6. The topology of the neural network shown in FIG. 6 defines the way the neurons are interconnected. The modified multilayer perceptron neural network used in this invention uses a feedforward topology which is characterized by layers of neurons cascaded together.

Each of the neural networks is trained to learn the statistical model of a particular error type. One neural network, for example, is dedicated to resolving A1B2 mismatches between OCR engines A and B. Once trained, each neural network accepts, as inputs, the various factors affecting character recognition accuracy as listed in Table 1 and the output characters from each of the OCR engines, to produce a best estimation of what the characters in question should be.

Figure 6:
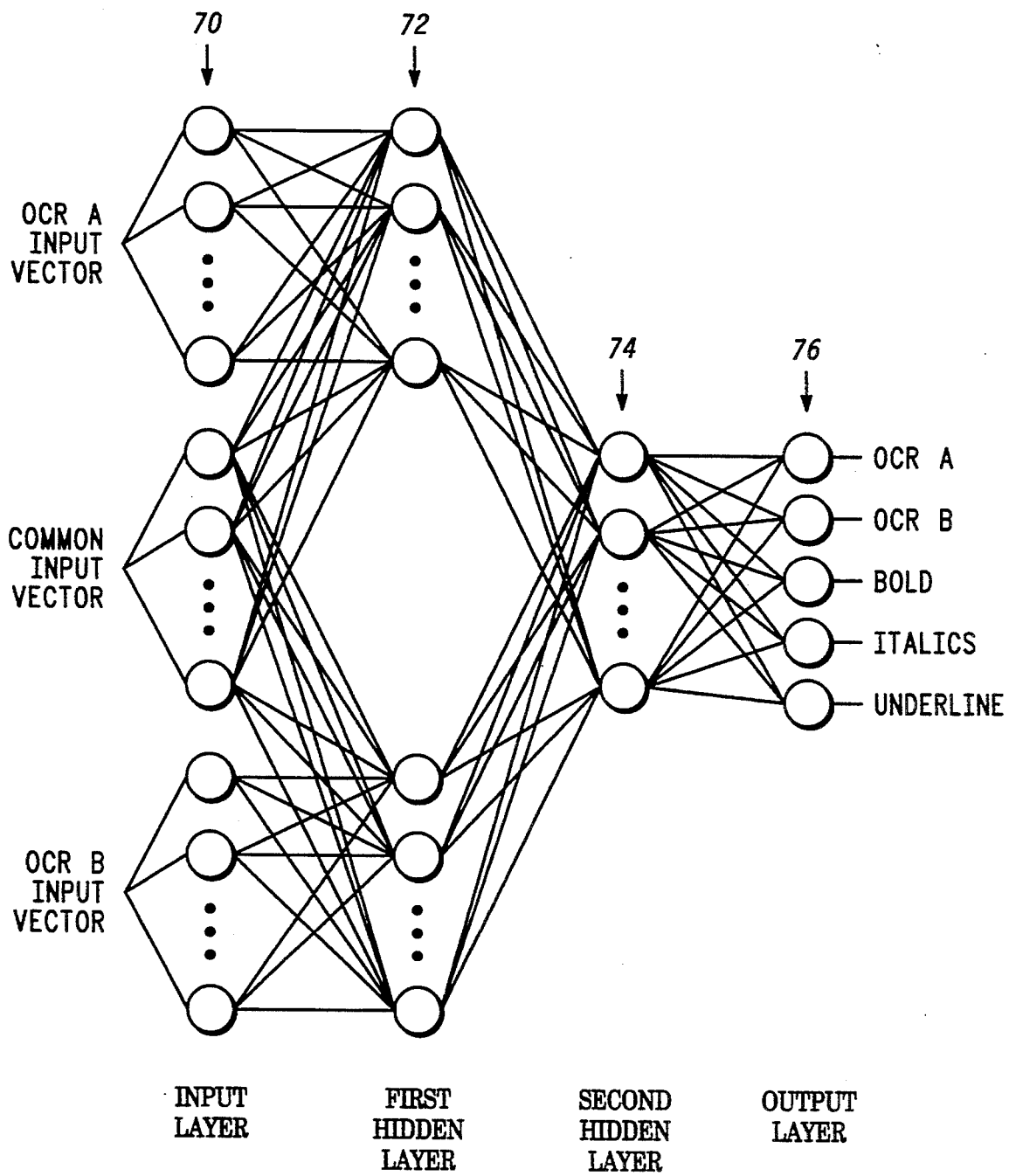
FIG. 6 shows the topology of a neural network used for character substitution errors in accordance with a preferred embodiment of the invention.

As shown in FIG. 6, each shaded circle 70, 72, 74, 76 is a neuron. Each neuron computes a squashed weighted sum of its inputs. Input patterns flow from input-layer neurons 70, through first and second hidden-layer neurons 72, 74 to the output-layer neurons 76. Neurons in a particular layer pass their outputs only to neurons in successive layers. The first layer of neurons is called the input-layer neurons 70 that have one input, no connection weights and no logistic nonlinear activation function. Each input-layer neuron connects to every neuron in the hidden layer within its OCR engine class. The input to the neural network is constructed from the outputs of the OCR engines. The outputs of the neural network are variables that indicate the most likely character plus the boldface, italics, underline, etc. attribute information.

The modified Multilayer Perceptron (mMLP) neural network shown in FIG. 6 is based on the general multilayer perceptron (MLP) structure that is widely known and used in the neural network field. The topology of the mMLP can be built using Genesis TM or PlaNet TM which are both commercially available. The mMLP structure was designed utilizing a large amount of a priori knowledge about the statistical model the neural network was to learn. Modifications were made to the neural network in the form of a connection scheme that utilized both sparse, local connections between the input-layer neurons and the first hidden-layer neurons. A further modification of the multilayer perceptron neural network was to create short cut connections between the first hidden-layer neurons and the output-layer neurons. These modifications were made to impose a structural relationship between input character and corresponding attribute information. For example, OCR A input-layer neurons are not connected to OCR B input-layer neurons. The effect of this connectivity is that two independent internal representations are formed. Each representation corresponds to input attribute information of one of the OCR engines OCR A or OCR B and their relationship to the common input attribute information. This reinforces critical variable relationships so that the global internal representation formed in the second hidden layer accurately represents the model.

Figure 7:
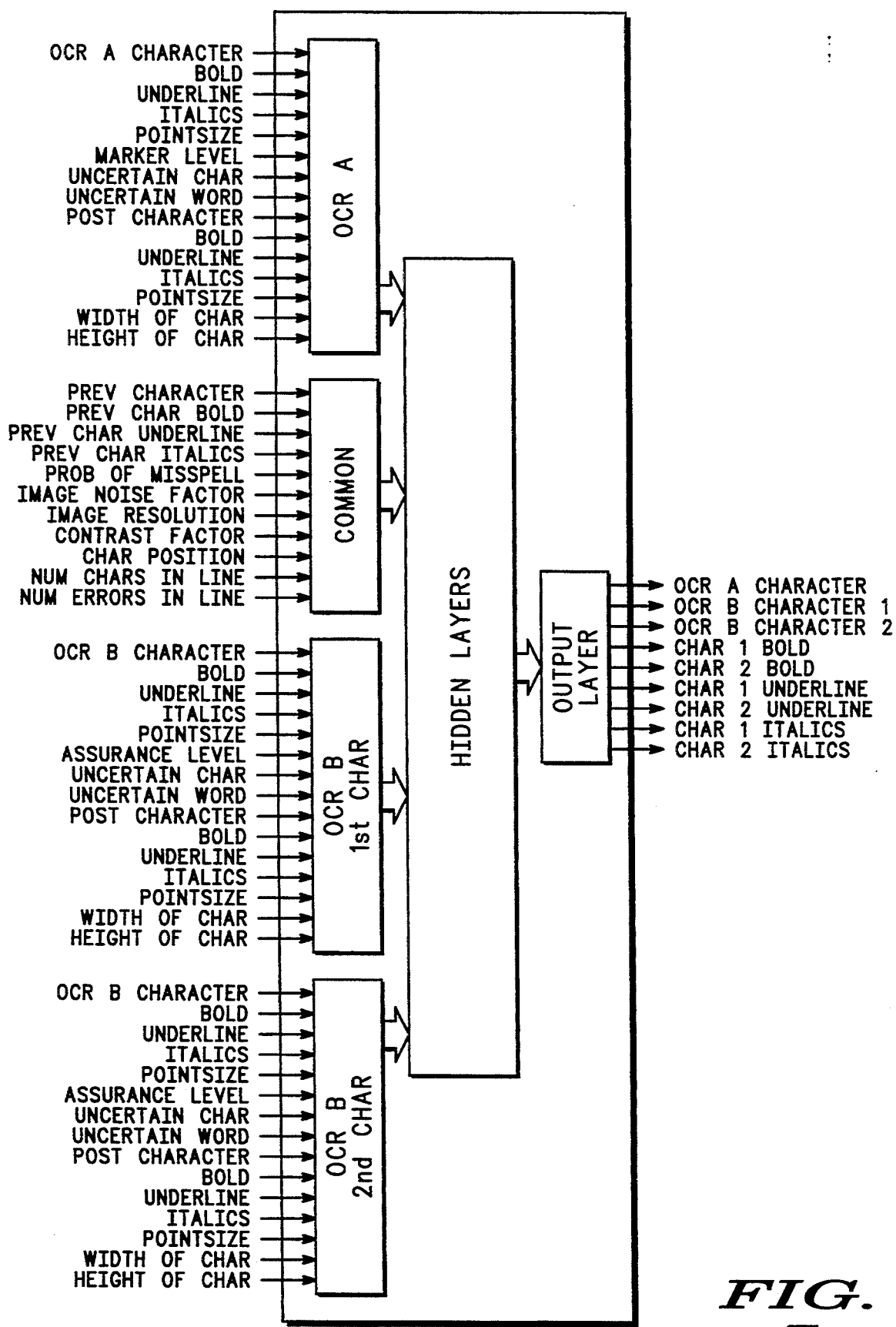
FIG. 7 illustrates a block diagram of a one-to-two (A1B2) character substitution neural network in accordance with a preferred embodiment of the invention.

FIG. 7 is a block diagram of one of the neural networks for the character substitution errors listed in Table 1. The neural network that is shown in FIG. 7 is used for A1B2. The input layer receives the output from OCR A engine which includes the character and its corresponding attributes. The A1B2 neural network also receives the two characters from OCR B and their attribute information. For the example above, input-layer OCR A receives the character "d" while input-layer OCR B receives character "c" and "l". Each of the input-layers also receives the corresponding attribute information for the characters received. The common information is additionally received by the A1B2 input-layer. This information is connected to all neurons of OCR A and B. Based on this information, the neural network was trained previously to recognize whether the correct character(s) is the letter "d" from OCR A or characters "c" and "l" from OCR B.

As shown in FIG. 7, the output of the neural network indicates which one of the OCR engines is more reliable. The output is a floating point number between the range of zero to one. If the neural network A1B2 chooses OCR A, then OCR A character will be a one and OCR B characters 1 and 2 will be zeroes. Moreover, since the letter "d" is not boldfaced, underlined or italicized, the attribute information will also be all zeroes. The output indicates which OCR output is the more probable to resolve the mismatch between conflicting OCR outputs.

If the output of the neural network is 0.7 for OCR A and 0.4 for OCR B, for example, this indicates that the neural network thinks OCR A was more certain in recognizing the correct character than was OCR B. The result of the neural network 26 is received by the controller 20 where resolution heuristics 24 are again consulted to try to resolve which OCR engine is more likely correct for this particular error.

The Backward Error Propagation (BEP) is a widely known and used learning algorithm for determining connection weights of each of the modified multilayer perceptron modules. Using the mMLP and BEP, one of ordinary skill in the art can teach each of the networks to correct the substitution and character-attribute errors listed in Table 1.

Based on the result from either the heuristics or one of the neural networks determining in step 158 what character is the correct character, the controller 20 will organize and store the chosen characters into a character stream. This step takes the output from one of the OCR engines which is analyzed to be correct and puts them into an output stream. This character stream is formatted in step 42 as an ASCII character stream with embedded markup and is output in step 42 as shown in FIG. 3. Some of the information may be displayed to an operator for further analysis if the heuristics or neural networks are extremely uncertain that the character is correct as analyzed.

It will be appreciated by those skilled in the art that the present invention overcomes a significant need in optical character recognition by providing an post-processing solution which combines the best optical character recognition features of each of the OCR software engines to identify and resolve characters erroneously recognized and transmitted by the OCR engines. Furthermore, this invention is capable of handling more than just two OCR engine outputs as was used throughout this description for purposes of illustration only.

Accordingly, it is intended by the appended claims to cover all modifications of the invention which fall within the true spirit and scope of the invention.

What is claimed is:

1. A method executed by a computer as part of a computer program for identifying and resolving characters and attributes of said characters erroneously recognized by a plurality of different optical character recognition engines, said characters originating from different types of character environments, said computer connectable to receive a plurality of different optical character recognition (OCR) engine outputs from corresponding said different OCR engines, said method comprising the steps of:

a) synchronizing said different OCR engine outputs from said different OCR engines to each other to detect matches and mismatches between said different OCR engine outputs from said different OCR engines by executing one or more synchronization heuristics to pattern match said OCR engine outputs, by varying a character substitution ratio and a number of look-ahead characters to determine whether the corresponding number of look-ahead characters in said OCR engine outputs match;

b) resolving each of said mismatches from said different OCR engines if any mismatch is detected in step (a); and c) outputting said matches and said resolved mismatches.

2. A method executed by a computer as part of a computer program for identifying and resolving characters and attributes of said characters erroneously recognized by a plurality of different optical character recognition engines, said characters originating from different types of character environments, said computer connectable to receive a plurality of different optical character recognition (OCR) engine outputs from corresponding said different OCR engines, said method comprising the steps of:
- a) synchronizing said different OCR engine outputs from said different OCR engines to each other to detect matches and mismatches between said different OCR engine outputs from said different OCR engines by performing the steps of:
  - a1) converting each of said OCR engine outputs into a corresponding character list;
  - a2) comparing each of said character lists to each other; and
  - a3) identifying said matches and said mismatches between said OCR engine outputs based on said comparing in step (a2);
- b) resolving each of said mismatches from said different OCR engines if any mismatch is detected in step (a); and
- c) outputting said matches and said resolved mismatches.

3. A method executed by a computer as part of a computer program for identifying and resolving characters and attributes of said characters erroneously recognized by a plurality of different Optical character recognition engines, said characters originating from different types of character environments, said computer connectable to receive a plurality of different optical character recognition (OCR) engine outputs from corresponding said different OCR engines, said method comprising the steps of:
- a) synchronizing said different OCR engine outputs from said different OCR entwines to each other to detect matches and mismatches between said different OCR engine outputs from said different OCR engines by performing the steps of:
  - a1) converting each of said OCR engine outputs into a corresponding character list;
  - a2) comparing each of said character lists to each other; and
  - a3) identifying character substitution errors between said character lists as a mismatch based on said comparing in step (a2);
- b) resolving each of said mismatches from said different OCR engines if any mismatch is detected in step (a); and
- c) outputting said matches and said resolved mismatches.

4. A method as recited in claim 3, further comprising the steps of:
- a4) converting each of said OCR engine outputs into a corresponding character-attribute list;
- a5) comparing attribute information of each of said matches and said mismatches; and
- a4) identifying character attribute errors between said character-attribute lists as a mismatch based on said comparing in step (a5).

5. A method executed by a computer as part of a computer program for identifying and resolving characters and attributes of said characters erroneously recognized by a plurality of different optical character recognition engines, said characters originating from different types of character environments, said computer connectable to receive a plurality of different optical character recognition (OCR) engine outputs from corresponding said different OCR engines, said method comprising the steps of:
- a) synchronizing said different OCR engine outputs from said different OCR engines to each other to detect matches and mismatches between said different OCR engine outputs from said different OCR engines:
- b) resolving each of said mismatches from said different OCR engines if any mismatch is detected in step (a) by performing the steps of:
  - b1) determining whether one or more resolution heuristics will resolve a mismatch of said mismatches;
  - b2) resolving said mismatch by applying said one or more resolution heuristics based on said determining in step (b1); and
  - b3) executing one of a plurality of neural networks to resolve said mismatch if none of said resolution heuristics are capable of resolving said mismatch; and
- c) outputting said matches and said resolved mismatches.

6. A method as recited in claim 5, further comprising the step of:
- b4) applying said one or more resolution heuristics based on an output of said one neural network when executed in step (b3) to resolve said mismatch.

7. A method as recited in claim 5, wherein step (b3) further comprises the step of:
using a modified multilayer perceptron neural network to resolve said mismatch.

8. A method as recited in claim 7, further comprising the step of:
training said modified multilayer perceptron neural network to resolve said mismatches using backward error propagation learning.

9. A method executed by a computer as part of a computer program for identifying and resolving characters and attributes of said characters erroneously recognized by a plurality of different optical character recognition engines, said characters originating from different types of character environments, said computer connectable to receive a plurality of different optical character recognition (OCR) engine outputs from corresponding said different OCR engines, said method comprising the steps of:
- a) synchronizing said different OCR engine outputs from said different OCR engines to each other to detect matches and mismatches between said different OCR engine outputs from said different OCR engines by performing the steps of:
  - a1) converting each of said OCR engine outputs into a corresponding character list and character-attribute list;
  - a2) comparing each of said character lists to each other;
  - a3) identifying character substitution errors between said character lists as a mismatch based on said comparing in step (a2);
  - a4) comparing attribute information of each of said matches and said mismatches; and a5) identifying character attribute errors between said character-attribute lists as a mismatch based on said comparing in step (a4);

b) resolving each of said mismatches from said different OCR engines if any mismatch is detected in step (a); and c) outputting said matches and said resolved mismatches.

10. A method as recited in claim 9, wherein step (b) comprises the steps of:

b1) determining whether one or more resolution heuristics will resolve a mismatch of said mismatches based on said character-attribute lists;

b2) executing said one or more resolution heuristics to resolve said mismatch based on said determining in step (b1); and b2) executing one of a plurality of neural networks using said character-attribute lists to resolve said mismatch if none of said one or more resolution heuristics are capable of resolving said mismatch.

11. A synchronization method for matching characters from a plurality of different character lists output by a corresponding plurality of different OCR engines, comprising the steps of:

a) adjusting a number of look-ahead characters which defines how many characters are being matched in each of said character lists from the different optical character recognition (OCR) engines;

b) adjusting a character substitution ratio which defines how many characters are being ignored in each of said character lists;

c) ignoring a number of characters in each of said character lists based on said character substitution ratio;

d) comparing a number of characters following said ignored characters in each of said character lists based on said number of look-ahead characters; and e) identifying a character substitution error if said number of look-ahead characters in each of said character lists match.

12. A synchronization method as recited in claim 11, further comprising the step of:

f) changing said character substitution ratio and said number of look-ahead characters until said number of look-ahead characters in each of said character lists match.

13. A synchronization method as recited in claim 11, further comprising the steps of:

f) changing said character substitution ratio until said number of look-ahead characters in each of said character lists match; and g) changing said number of look-ahead characters until said number of look-ahead characters matches and said number of look-ahead characters is greater than zero.

* * * * *

UNITED STATES PATENT AND TRADEMARK OFFICE
CERTIFICATE OF CORRECTION

PATENT NO. : 5,418,864
DATED : May 23, 1995
INVENTOR(S) : Michael C. Murdock; Marc A. Newman It is certified that error appears in the above-indentified patent and that said Letters Patent is hereby corrected as shown below:

In Claim 3, column 17, line 33, delete "Optical" and insert --optical--.

In Claim 3, column 17, line 41, delete "entwines" and insert --engines--.

In Claim 5, column 18, line 12, delete ":" and insert --;--.

Signed and Sealed this

Twenty-third Day of April, 1996

Attest:

BRUCE LEHMAN

*Attesting Officer*  *Commissioner of Patents and Trademarks*